United States Patent [19]

Hucul et al.

[11] Patent Number: 5,002,173
[45] Date of Patent: Mar. 26, 1991

[54] BREAKAWAY CLUTCH DEVICE

[75] Inventors: Daniel E. Hucul, New Baltimore; James F. Burkhardt, Farmington Hills; Ronald R. Matheson, Utica, all of Mich.

[73] Assignee: Auto/Con Corporation, Mt. Clemens, Mich.

[21] Appl. No.: 486,092

[22] Filed: Mar. 5, 1990

Related U.S. Application Data

[63] Continuation-in-part of Ser. No. 320,941, Mar. 9, 1989, abandoned.

[51] Int. Cl.⁵ .......................... B25J 19/00; B25J 17/02
[52] U.S. Cl. ...................................... 192/150; 901/29; 901/49; 192/56 F
[58] Field of Search .................. 192/150, 56 F, 56 L; 901/29, 49

[56]         References Cited
U.S. PATENT DOCUMENTS

| | | | |
|---|---|---|---|
| 3,205,986 | 9/1965 | Kramer | 192/150 |
| 4,593,800 | 6/1986 | Ness et al. | 192/150 |
| 4,700,932 | 10/1987 | Katsuno | 901/29 |
| 4,717,003 | 1/1988 | McCormick et al. | 901/49 |
| 4,768,821 | 9/1988 | Hucul et al. | 294/119.1 |

OTHER PUBLICATIONS

Product Literature: *Multiclutch Breakaway Safety Device*.

Product Literature: *Wrist-Watch*, manufactured by Manufacturing Directives, Inc., West Bloomfield, Mich.

*Primary Examiner*—Rodney H. Bonck
*Assistant Examiner*—Andrea Pitts
*Attorney, Agent, or Firm*—Harness, Dickey & Pierce

[57]         ABSTRACT

A clutch device adapted for use with robotic tooling is disclosed. The clutch device, which is assembled in a housing having a longitudinal axis, includes a sensing device for detecting undesired pressure from an external source. A rod is fixably secured to the housing and extends along the longitudinal axis of the housing. A collar assembly is provided for connecting the clutch device to robotic tooling. The collar assembly is capable of being pivotally associated with the housing. A piston assembly, which is in communication with the sensing device, is disposed about the rod and moves the collar assembly between a first substantially static position to a second broken-away position upon receiving a signal from the sensing device.

40 Claims, 6 Drawing Sheets

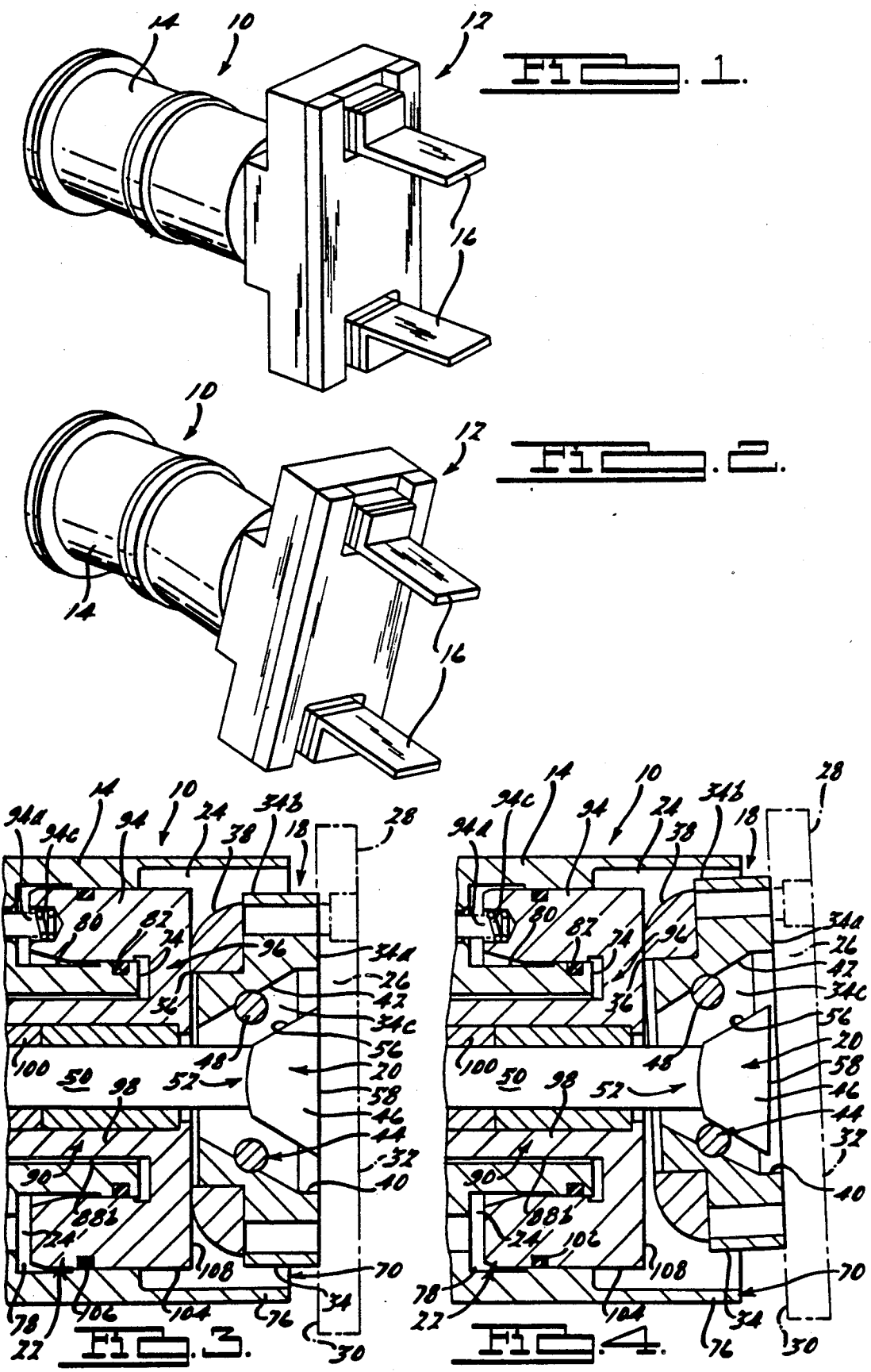

BREAKAWAY CLUTCH DEVICE

CROSS-REFERENCE TO RELATED APPLICATION

This application is a continuation-in-part application of commonly-owned U.S. Pat. No. 320,941, entitled "Breakaway Clutch Device," filed March 9, 1989 and now abandoned.

TECHNICAL FIELD

The present invention relates to robotic apparatus and, more particularly, to breakaway clutch devices.

BACKGROUND OF THE INVENTION

With the growing popularity of robotics in industry, there has been an increased need to reduce robot arm and wrist damage, and thereby minimize robot down-time, caused by undesired pressure exerted from external sources. In this regard, the robotics industry currently employs breakaway clutch devices, i.e. devices which interface with a robotic arm and robotic tooling to permit the robotic tooling to breakaway from sources of undesired pressure.

One presently known breakaway clutch device generally includes a housing which connects to a robot arm, and a mounting plate pivotally connected to the housing. The mounting plate, in turn, connects to robotic tooling, such as a robotic gripper apparatus. In normal operation of a robot, the mounting plate is maintained in a generally fixed relationship relative to the housing. Upon detection of an undesired pressure from an external source, the breakaway clutch device detects the pressure and advances a piston in a direction generally toward the pressure to cause the mounting plate to breakaway.

A disadvantage to this presently known breakaway device is that its construction provides for limited amounts of compliance to permit effective breakaway of the mounting plate. As used herein the term "compliance" refers generally to the distance that the mounting plate of the clutch device can travel when it yields to external pressure sources after having broken away. Further, the mounting plate is limited in its ability to rotate or orbit about a longitudinal axis of the clutch device in a direction generally away from the external pressure source. As a consequence of these disadvantages, often times this type of device may become jarred out of position and thereby require time-consuming reprogramming and retooling.

SUMMARY OF THE INVENTION

In accordance with the present invention, a clutch device adapted for use with robotic tooling is disclosed. The clutch device, which is assembled in a housing having a longitudinal axis, includes a sensing device for detecting undesired pressure from an external source. A rod is fixably secured to the housing and extends along the longitudinal axis of the housing. A collar assembly is provided for connecting the clutch device to robotic tooling. The collar assembly is capable of being pivotally associated with the housing. A piston assembly, which is in communication with the sensing device, is disposed about the rod and moves the collar assembly between a first substantially static position to a second broken-away position upon receiving a signal from the sensing device.

The present invention overcomes the disadvantages of other known breakaway clutch devices by providing a breakaway clutch device exhibiting generally increased compliance for breakaway relative to other devices of similar dimensions. The generally increased compliance permits breakaway about a generally transverse axis of the clutch device, as well as permitting the robot tooling connected to a mounting plate to rotate and/or orbit at least partially about a longitudinal axis of the clutch device, in a direction generally away from the undesired external pressure. Thus, because the present invention permits a wider variety of possible breakaway positions than other breakaway clutch devices, robot down-time caused by breakaway should be decreased.

Other objects and advantages of the invention will become apparent upon reading the following detailed description and upon reference to the drawings.

BRIEF DESCRIPTION OF THE DRAWINGS

FIG. 1 is a perspective view of a breakaway clutch device having a robotic gripper apparatus attached thereto in a generally non-broken-away position.

FIG. 2 is a perspective view of a breakaway clutch device having a robotic gripper apparatus in a generally broken-away position and rotated slightly about a generally longitudinal axis of the breakaway clutch device.

FIG. 3 is a fragmentary cross-sectional view through a longitudinal plane of the clutch device in a generally broken-away position.

FIG. 4 is a fragmentary cross-sectional view through a longitudinal plane of the clutch device in a generally broken-away position.

DESCRIPTION OF THE PREFERRED EMBODIMENTS

Figure 5:
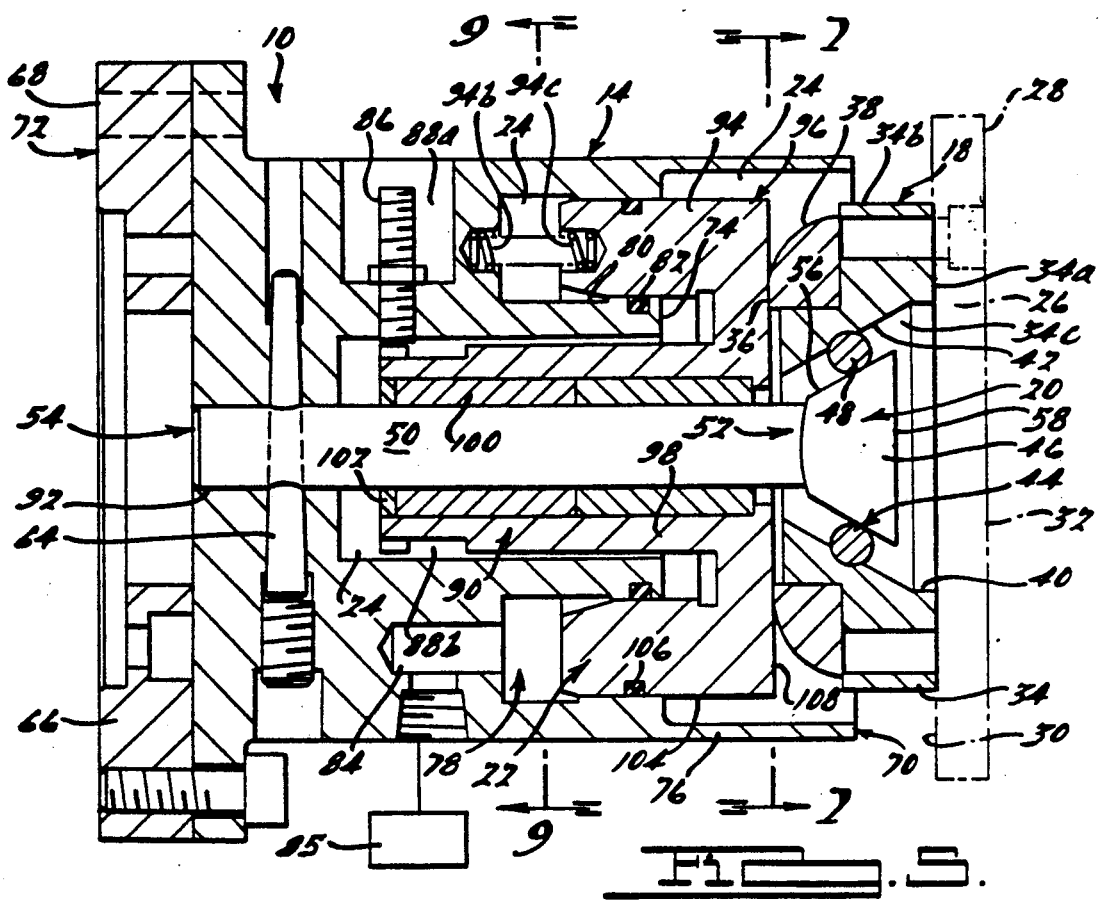
FIG. 5 is a cross-sectional view taken through a longitudinal plane of a breakaway clutch device in a generally non-broken-away position.

Referring to the drawings, particularly FIG. 1, the breakaway clutch device 10, referred to herein as clutch device 10, of the present invention is disclosed in connection with a robotic gripper apparatus 12. A main housing 14 of the clutch device 10 is shown. The robotic gripper apparatus 12 is shown having a plurality of finger members 16 thereon, such as the gripper apparatus disclosed in U.S. Pat. No. 4,768,821, which is hereby expressly incorporated by reference. During normal operation of a robot, the clutch device 10 of the present invention is preferably in a generally non-broken-away position.

The use of the term "broken-away" or "breakaway" herein is intended to describe the general positional relation between the robotic gripper apparatus 12 and the main housing 14 of the clutch device 10. Upon sensing an undesired pressure from an external source, the clutch device 10 preferably breaks away to a position such as that depicted in FIG. 2. Therefore, when in a generally broken-away position, the main housing 14 of the clutch device 10 is disposed, with respect to the gripper apparatus 12, in a generally bent or inclined relationship, and possibly a rotated position, as compared to the non-broken-away position.

Depicted in FIG. 5 is the clutch device 10 of the present invention in a generally static and non-broken-away position. The clutch device 10, of the present preferred embodiment includes a collar assembly 18, a rod-and-hemispherical ball assembly 20, a piston assembly 22, and a housing 14 having a longitudinal axis and a hollowed-out portion 24 for housing the collar, rod and ball, and piston assemblies and for communicating with a pneumatic source and a sensing device.

The collar assembly 18 preferably includes a mounting plate 26, having a first surface 28 and a second surface 30, for connecting the clutch device 10 to robotic tooling such as a gripper apparatus. The first surface 28 has a plurality of apertures 32 therein for mounting the robotic tooling, such as the gripper apparatus 12 disclosed in FIGS. 1 and 2, to the clutch device 10.

As shown in FIG. 5, the collar assembly 18 preferably includes a collar 34 having a rim 34a and a base 36. The second surface 30 of the mounting plate 26 is connected to the collar 34 in generally circumferentially manner at the rim 34a of the collar 34. The collar 34 substantially surrounds the rod-and-hemispherical ball assembly 20. The collar 34 further has an exterior surface 34b which preferably has a rounded edge 38 formed circumferentially about the base 36 to permit the collar assembly 18 to rock against the piston assembly 22 when the clutch device 10 is in a generally broken-away position. The collar 34 preferably has a cavity 34c formed by an inside wall 40. Preferably, at least a portion of the inside wall 40 of the collar 34 is tapered inwardly toward the base 36, in a substantially uniform manner around the circumference of the inside wall 40, to form a tapered portion 42.

The exterior surface of the base 36 of the collar 34 is preferably disposed in a mating relationship with the piston assembly 22 when the clutch device 10 is in a non-broken-away position.

Figure 7:
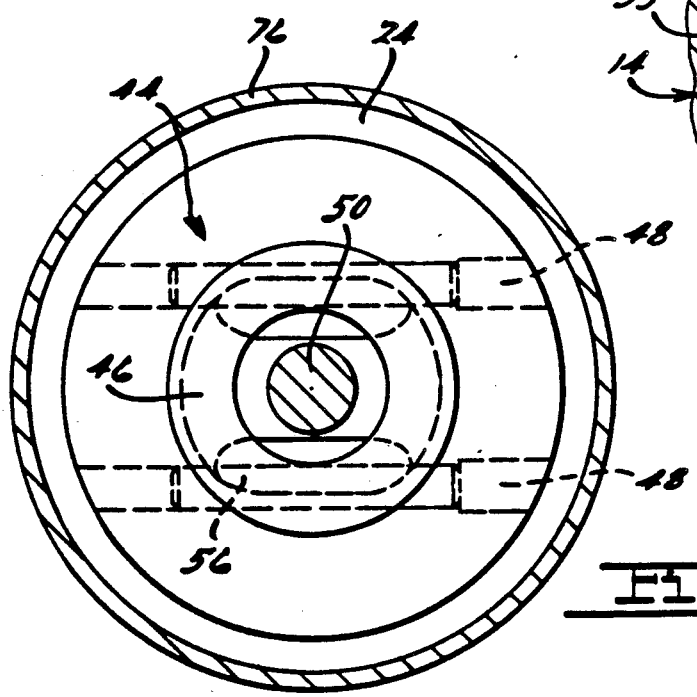
FIG. 7 is a cross-sectional view of the clutch device taken from a transverse plane of line 7—7 of FIG. 5.

Preferably mounted to the tapered portion 42 of the inside wall 40 of the collar 34 is a pin assembly 44. The pin assembly 44, which is depicted in FIG. 7 in association with a hemispherical ball 46 of the rod-and-hemispherical ball assembly 20, preferably includes a plurality of pins 48. The present preferred pin assembly 44 includes two pins 48 disposed substantially parallel to each other. The pin assembly 44 is further disposed on generally opposite sides of and in a generally spaced relationship therewith, a rod 50. Preferably the pin assembly is disposed with respect to the rod-and-hemispherical ball assembly 20 so as to permit the collar assembly 18 to pivot and/or rotate, or at least partially orbit, about the rod-and-hemispherical ball assembly 20 in certain instances when the clutch device 10 is in a generally broken-away position.

Returning to FIG. 5 the rod-and-hemispherical ball assembly 20 includes a rod 50, preferably made of a suitable metal such as steel, having a first end 52 and a second end 54, and a hemispherical ball 46 attached to the first end 52 of the rod 50. As is best shown in FIGS. 5 and 7, the hemispherical ball 46 has a predetermined diameter, which is preferably large enough to prevent the hemispherical ball 46 from slipping through the pin assembly 44 and becoming completely disengaged from the pin assembly 44 during operation of the clutch device.

Figure 8:
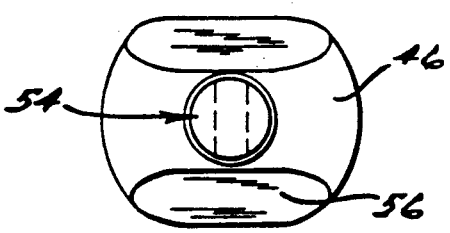
FIG. 8 is a rear elevational view of the hemispherical ball of FIG. 7 having flat surfaces thereon.
Figure 10:
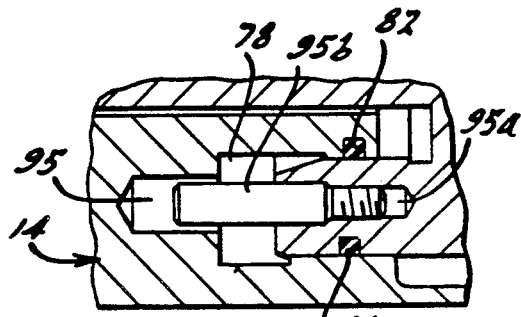
FIG. 10 is a longitudinal cross-sectional view of an anti-rotation pin.

Further, as shown in FIG. 8, the hemispherical ball 46 preferably has a plurality of flat surfaces 56 formed in the rounded portion of the hemispherical ball 46. Each flat surface of the hemispherical ball preferably has about the same amount of flat area, and each flat surface is preferably spaced substantially equidistant apart from each other. The flat surfaces 56 preferably are formed so that they can be disposed substantially opposite the tapered portion 42 of the inside wall of the collar 34 when the clutch device is in a generally non-broken-away position. Further, it is preferred that the number of flat surfaces 56 on the hemispherical ball 46 corresponds to the number of pins 48 in the pin assembly 44. Thus, as shown in FIG. 5, when the clutch device 10 is in a generally non-broken-away position each of the flat surfaces 56 of the hemispherical ball 46 are maintained in contact with a respective pin 48 from the pin assembly 44. The hemispherical ball also has a face 58.

The rod 50 is joined with the hemispherical ball 46 in any suitable manner. Preferably the rod 50 and hemispherical ball 46 are formed as a single integral unit. Alternatively, the hemispherical ball 46 may be welded to the rod 50 to join the hemispherical ball 46 to the rod 50. It is also possible to join the hemispherical ball 46 to the rod 50 with a fastening pin.

Referring again to FIG. 5, the hemispherical ball 46 is thus positioned on the first end 52 of the rod 50 so that the face 58 of the hemispherical ball 46 is disposed in a spaced relationship with and substantially parallel to the mounting plate 26 when the clutch device 10 is in a generally non-broken-away position. The rod 50 extends generally along the longitudinal axis of the housing 14 and is preferably fixably secured to the housing 14 with a pin 64 near the second end 54 of the rod 50. Preferably the pin 64 is a tapered dowel pin to help minimize wear in the second end region of the rod 50, and thereby help preserve a relatively secure and static connection between the rod 50 and the housing 14.

Figure 6:
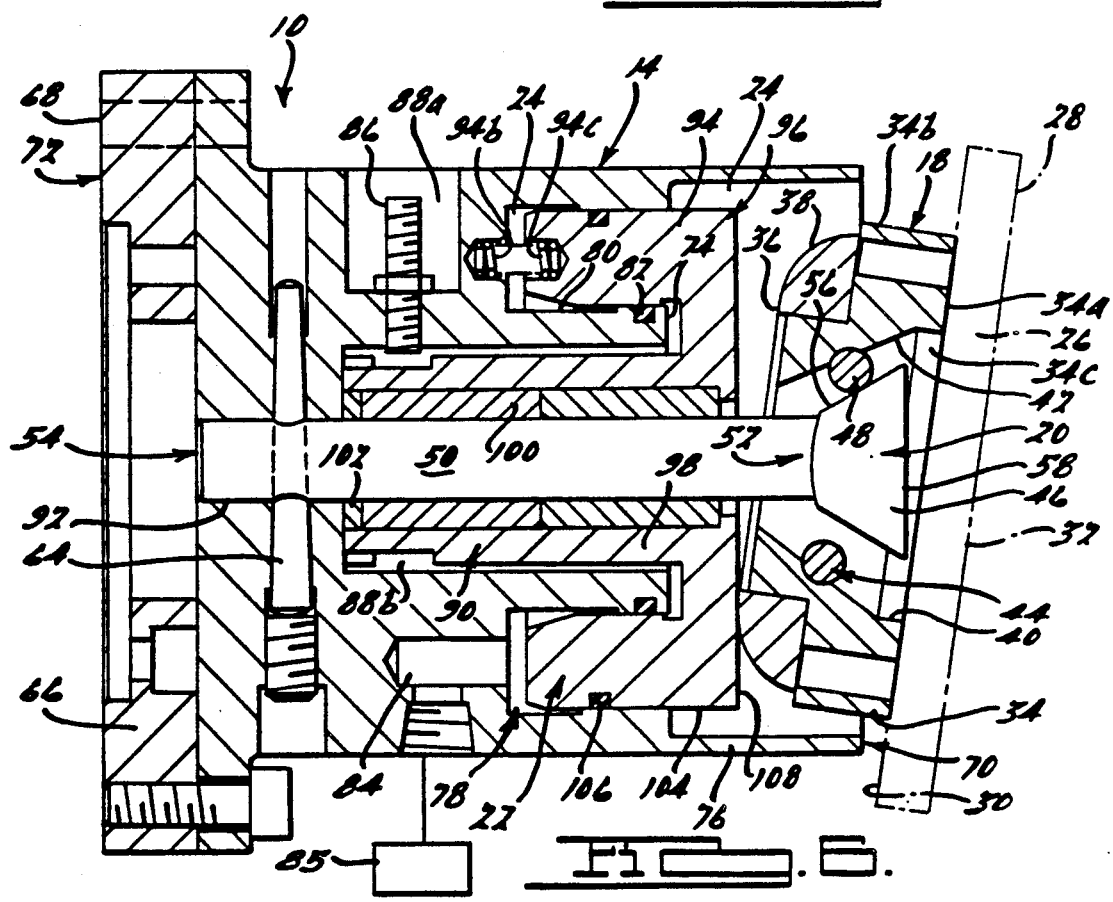
FIG. 6 is a cross-sectional view taken through a longitudinal plane of the breakaway clutch device in a generally broken-away position.

Referring to FIGS. 5 and 6, the housing 14 of the present preferred clutch device 10 includes a base 66 having a plurality of apertures 68 therein for mounting the clutch device 10 to robotic apparatus such as a robot arm (not shown). The housing 14 has a first end 70 and a second end 72. The housing 14 further has a hollowed-out region 24 to house the collar, rod and ball and piston assemblies, and to provide for communication between the hollowed-out portions 24, a pneumatic source and a proximity sensing device such as an electromagnetic proximity sensing device.

In the region near the first end 70 of the housing 14, the housing has been hollowed-out to generally define a transverse surface 74. Protruding from the transverse surface 74 generally in the longitudinal direction of the housing 14, and substantially circumferentially surrounding the housing 14 is a flange 76. Preferably, the inside diameter of the flange 76 is greater than the outside diameter of the collar, to provide for lateral movement of the collar assembly 18 in a generally lateral direction in a plane substantially transverse to the longitudinal axis of the housing 14, when in a broken-away position, such as is shown in FIG. 4.

Figure 9:
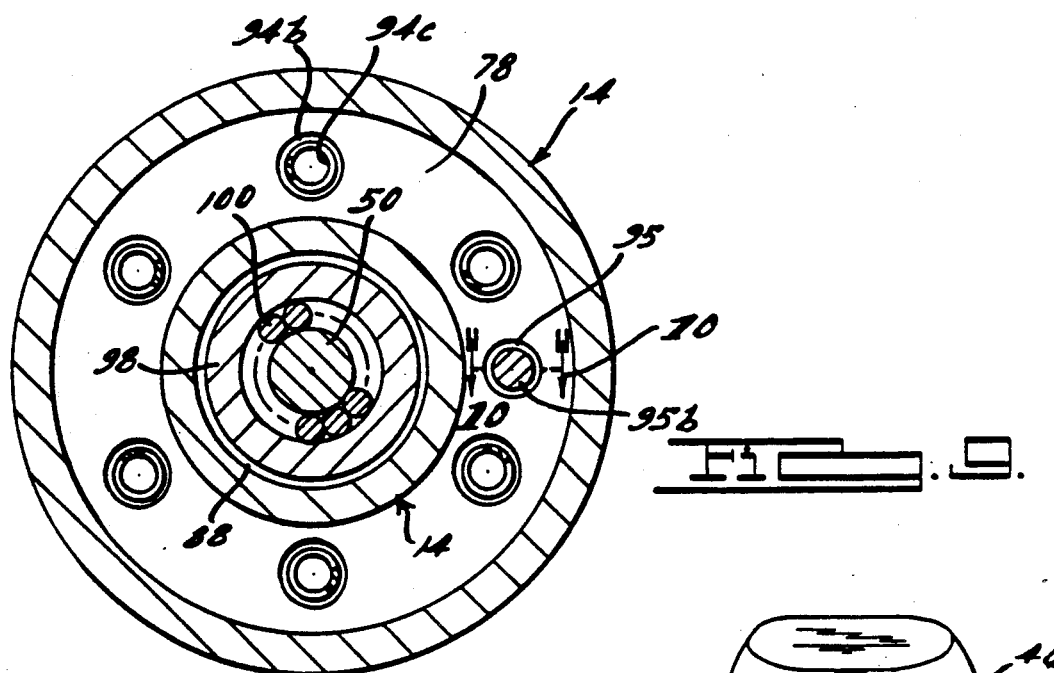
FIG. 9 is a cross-sectional view of the clutch device taken from a transverse plane defined by line 9—9 of FIG. 5.

Referring to FIGS. 5, 6 and 9, extending toward the second end 72 of the housing from the transverse surface 74, is a portion of the hollowed-out portion 24, which defines a substantially annular groove 78 having a predetermined depth, and having an inside wall 80 therein. Substantially encircling a portion of the inside wall 80 is a O-ring 82 or other suitable sealing means for forming a substantially gas-tight channel when the piston assembly is brought into a mating relation therewith. The O-ring 82 is preferably positioned in a region near the transverse surface 74 of the housing 14.

A passage 84, further defining a portion of the hollowed-out portion 24, is provided at a predetermined location in the annular groove and penetrates through the housing. A communication is thereby created between the annular groove 78 and a pneumatic source, i.e. a source for supplying gas to the substantially gas-tight channel formed in the annular groove. The passage 84 permits the ingress and egress of pneumatic gasses to raise or lower the piston assembly 22 upon receiving a signal from a suitable pressure sensing device, i.e. sensing device, which is in communication with the pneumatic source. The sensing device preferably is suitable for detecting a broad range of pressures occasioned by undesired external motion. A proximity sensor 86 preferably penetrates a side wall of the housing and extends partially into a cavity 88a. The cavity 88a further defines a portion of the hollowed-out portion 24. The proximity sensor 86 is preferably in communication with the pneumatic source and assists to control the proper amount of gas necessary to raise or lower the piston assembly 22.

Disposed substantially concentric with the annular groove 78 is a generally cylindrical cavity 88b for housing a base portion 90 of the piston assembly 22.

A bore 92 extending toward the base of the housing is found in the base region of the cavity 88b. The bore 92, which further defines a hollowed-out portion 24 of the housing 14, likewise is substantially concentric with and in a generally coaxial relationship with the cylindrical cavity 88b and the annular groove 78. The bore 92 preferably receives the second end 54 of the rod 50. In this regard, the pin 64 or other suitable fastening device extends transversely through the housing 14 and bore 92 and penetrates through the rod 50 to thereby fixably secure the rod to the housing 14.

The piston assembly 22 is a generally annular T-shaped assembly having a protruding flange 94 extending generally longitudinally downward (toward the second end 72 of the housing) from the end regions of a transverse portion 96 of the "T" in the T-shaped assembly. A portion of the protruding flange 94 is preferably hollowed out in one or more predetermined locations to define a plurality of spring housings 94a. Preferably, the spring housings are disposed opposite one or more longitudinally extending bores 94b in the base of the annular groove 78. A spring mechanism 94c is provided in a mating relationship with the spring housing 94a and the bore 94b. The spring mechanism serves to provide additional support for the piston assembly in instances including a sudden decompression within the annular groove 78, such as caused by loss of air flow or power. Disposed between at least two of the bores 94b is at least one longitudinally extending bore 95.

Also, disposed between at least two of spring housings 94b in the protruding flange and substantially opposite the bore 95 is a housing 95a for an antirotation pin 95b. The antirotation pin is preferably fixably secured to the antirotation pin housing 95a, and is disposed in a mating relationship with the bore 95. The antirotation pin 95b serves to limit substantially the rotation of the piston assembly about the longitudinal axis of the housing.

The piston assembly 22 preferably includes a piston 98. As seen in FIGS. 5 and 6, the base portion 90 of the piston assembly 22 includes a portion of the generally annular "T" shaped configuration extending in the longitudinal direction, of the piston assembly 22. The piston 98 is preferably cylindrical and has a bore extending longitudinally therethrough to define an inside wall of the piston 98. A suitable bushing 100, such as a Thomson TM ball bushing, is preferably disposed coaxially with the base portion 90 of the piston assembly 22. Preferably the outer surface of the bushing 100 is maintained in a generally contacting or frictional relationship with the inside wall of the piston 98, to cause the bushing 100 to move generally in synchronization with the piston 98 in a substantially longitudinal direction. The inside portion of the bushing 100 is preferably maintained in a generally surrounding and sliding relationship with the rod 50, and thereby permits the bushing 100 to slide along the rod 50.

A retaining ring 102, such as a Thomson TM retaining ring preferably surrounds the rod 50 at the end region of the base portion 90 of the piston assembly 22 nearest the base 66 of the housing 14. The retaining ring 102 is preferably maintained in contact with an end of the bushing 100 nearest the base 66 of the housing 14. The outermost surface 104 of the protruding flange 94, of the piston assembly 22 preferably has an O-ring 106 disposed circumferentially about the protruding flange 94 to facilitate the formation of a sealing and substantially gas-tight contact between the annular groove 78 of the housing and the downwardly extending flange 94 of the piston assembly 22 when the piston assembly 22 is disposed fittingly within the housing 14. An annular sealed and substantially gas-tight channel is thereby formed in the annular groove 78 into which predetermined amounts of a gas may be controllably introduced to cause the piston assembly to raise or lower in a longitudinal direction in response to sensing undesired external pressure.

An upper surface 108 of the transverse portion of the piston preferably is maintained in a mating relationship with the base of the collar 34 when the clutch device 10 is in a generally non-broken-away position. This relationship is better illustrated by referring once again to FIG. 5. As shown in FIG. 6, preferably the rounded edge 38 of the collar 34 can rock on the upper surface 108 of the transverse portion of the piston when the clutch device 10 is in a generally broken-away position.

The operation of the present preferred clutch device can best be illustrated by reference to FIGS. 1–6 in accordance with the following description.

In operation of the present preferred embodiment the clutch device 10 will preferably cause the collar assembly including the mounting plate 26 to break away from detected motion caused by external sources by creating compliance in a generally longitudinal direction. To accomplish an effective breakaway, the sensor device associated with the pneumatic source will preferably detect undesired pressure from an external source. A signal will be transmitted to a suitable control associated with the pneumatic source and thereby cause to be introduced into the substantially gas-tight annular groove (for ordinary non-broken-away operation of the clutch device), or be evacuated therefrom (for broken-away operation of the clutch device), an amount of gas predetermined to raise or lower the piston assembly to a predetermined level. If undesired irregular motion is detected by the sensor device it will thus transmit a suitable signal to the pneumatic source and cause the pneumatic source to evacuate a predetermined amount of gas from the substantially gas-tight annular groove 78. It should be appreciated that alternatively, suitable fluids, such as encountered in hydraulics, may be substituted for the gasses in the present embodiment.

Upon evacuation of a predetermined amount of gas from the annular groove 78, the downwardly turned flange 94 of the piston assembly 22 generally slides in a direction toward the second end 72 of the housing 14. Compliance in a generally longitudinal direction can thus be created between the upper surface 108 of the transverse portion of the piston, and the base 36 of the collar assembly 18. The collar assembly 18 is thereby able to pivot away, or break away, from the external pressure source. As shown in FIGS. 3, 4 and 6, due to the lowering of the piston in retreat from the undesired external pressure, and thus in a direction generally away from the collar assembly 18, clearance is also created between at least one of the pins 48 of the pin assembly 44 and at least one of the COrresponding flat surface 56 of the hemispherical ball 46.

In addition to being able to break away from an external pressure source about a generally transverse axis it is contemplated that, in many instances, evacuation of the annular groove 78 and consequent lowering of the piston assembly 22, will create a clearance between the pin assembly 44 and the hemispherical ball 46 so that the collar assembly 18 of the clutch device 10 of the present invention may move in at least a partially rotational or orbital manner. For instance, without limitation, it is contemplated that when broken-away, the collar assembly 18 can pivot about a generally longitudinal axis. Under certain conditions, therefore, it is possible to achieve breakaway of the collar assembly 18 in a direction along a generally longitudinal axis of the clutch device 10, as well as rotationally about substantially the same axis. Full 360 degree rotation about a generally longitudinal axis is also contemplated in certain instances. Further, as shown in FIG. 4, breakaway in a generally lateral direction in a plane substantially transverse to the longitudinal axis of the housing 14 is also contemplated in some circumstances. Combinations of one or more of the above breakaway positions are also within the scope of the present invention.

After the undesired external pressure source is removed, the clutch device 10 can be returned to its generally non-broken-away position relatively quickly and without substantial reprogramming or tool reset. The pneumatic source is activated, causing it to fill the annular groove with gas and thereby raise the piston assembly 22 in a direction opposite the base of the housing 14. The pins 48 of the pin assembly 44 will then come to a resting position generally in contact with the flat surfaces 56 of the hemispherical ball 46.

Figure 11:
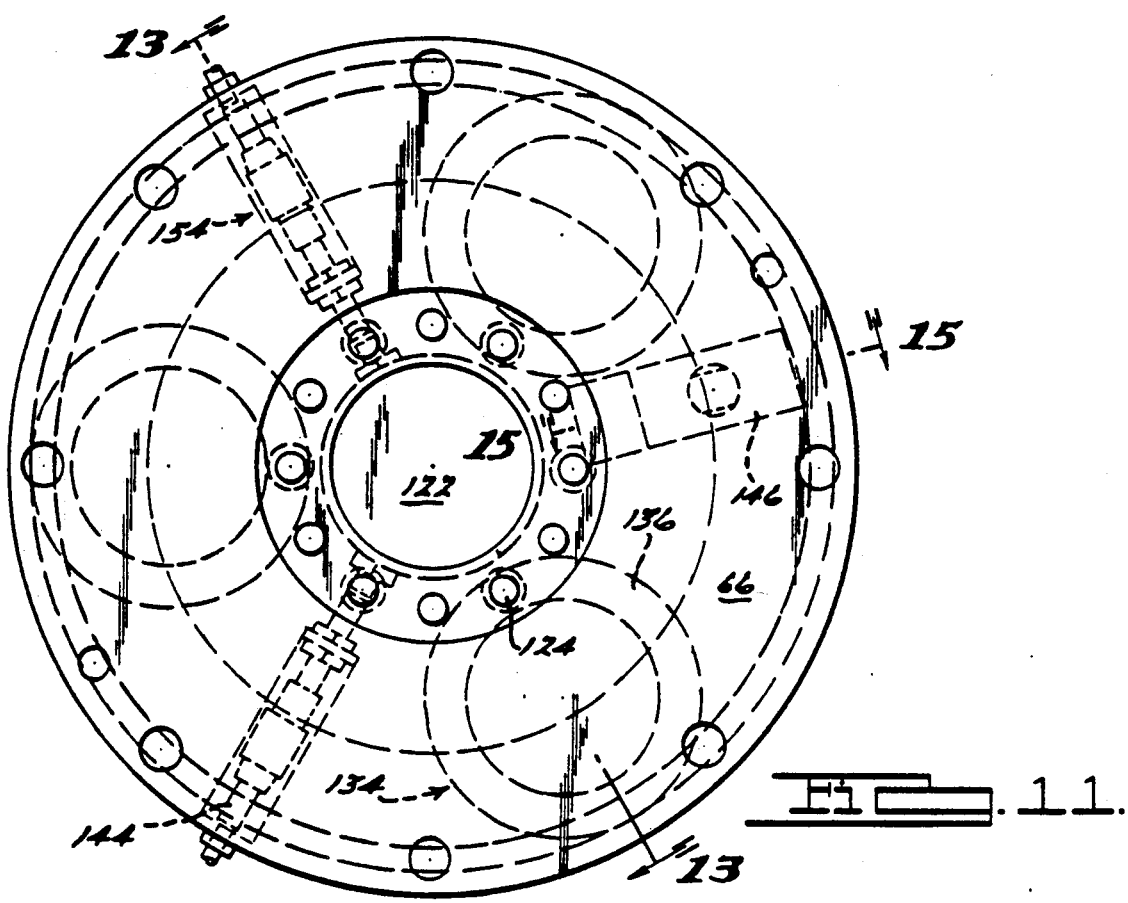
FIG. 11 is an elevated front view of an alternative clutch device of the present invention.
Figure 12:
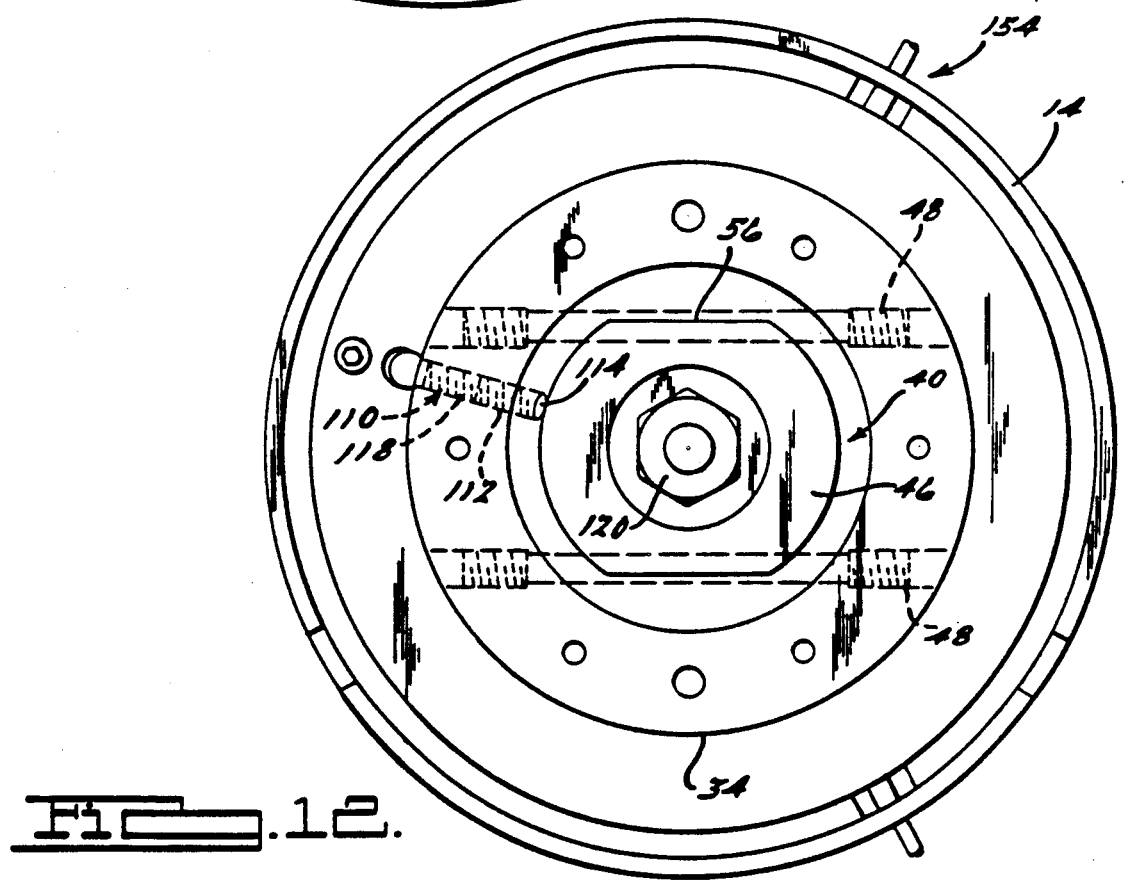
FIG. 12 is an elevated view of the clutch device of FIG. 11 taken from the base of the housing for the clutch device.
Figure 13:
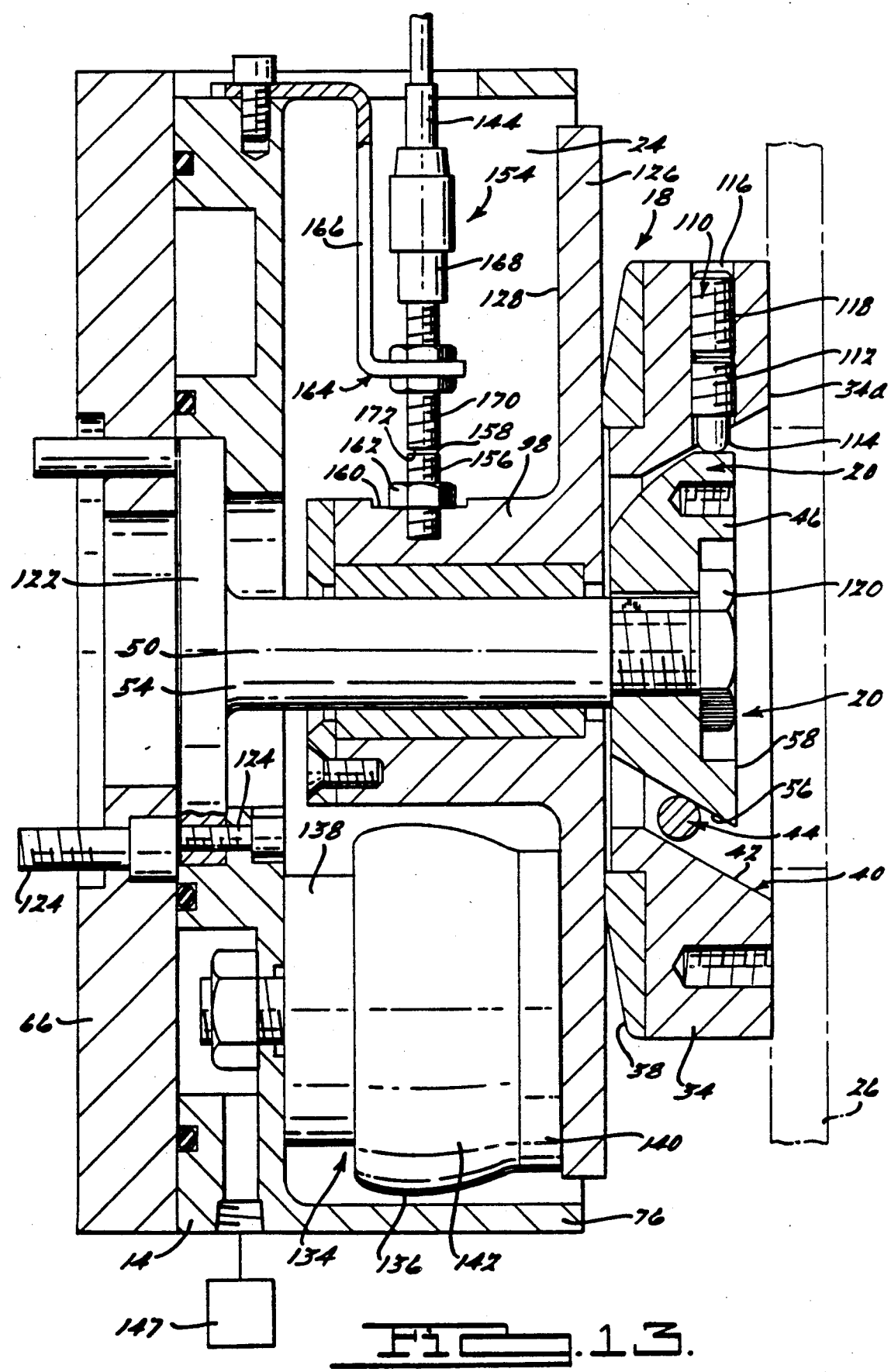
FIG. 13 is a vertical cross-sectional view taken through line 13—13 of FIG. 11.
Figure 14:
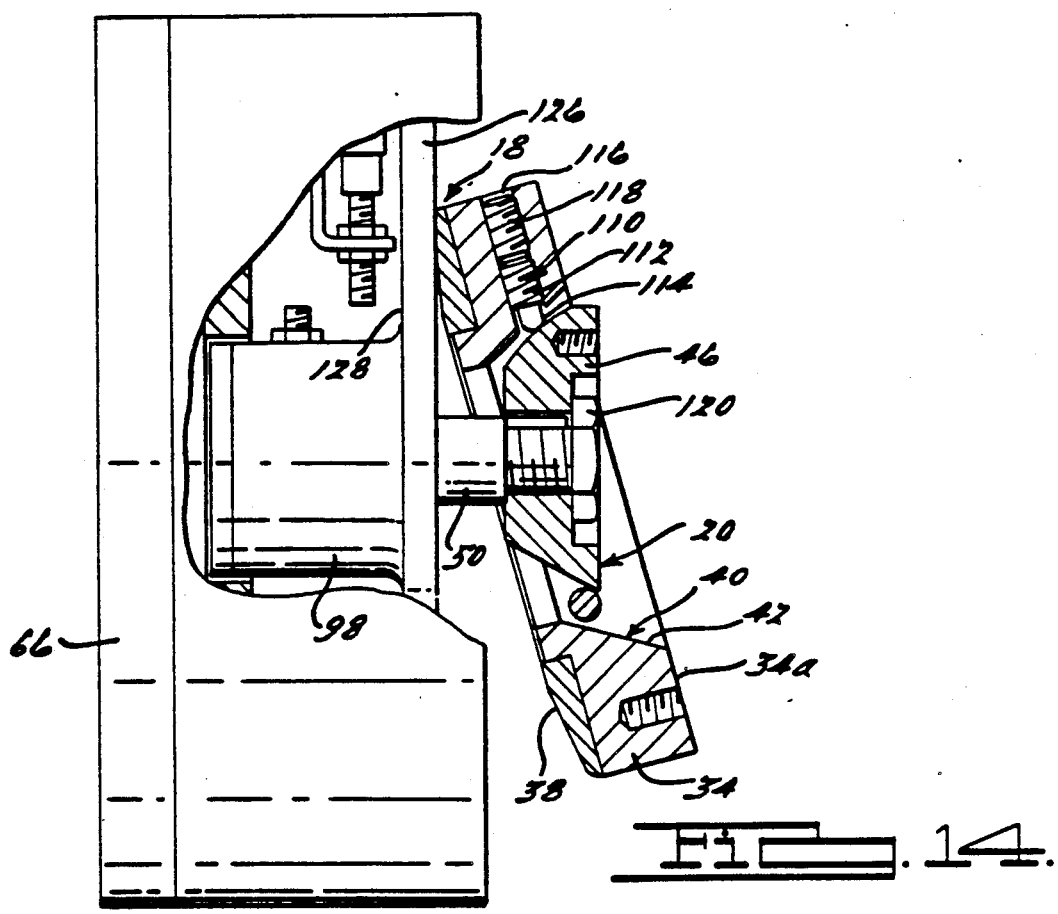
FIG. 14 is a partial cutaway view of the clutch device of FIG. 11 shown in a generally broken-away position, without a mounting plate.

Shown in FIGS. 11-15 is an alternative embodiment of the present clutch devices, which is the embodiment presently preferred by the applicants. More particularly, shown in FIGS. 13 and 14 is the collar assembly 18 further including a centering assembly 110 disposed in a generally transverse plane. The centering assembly as used herein comprises an assembly for facilitating the return (centering) of the collar assembly 18 from a broken-away position to its "centered" non-broken-away position. The centering assembly 110 preferably includes at least one radially disposed set screw 112. A typical set screw has a free end 114 that preferably protrudes from the inside wall 40 of the collar 34. The set screw is adjustably secured within a radially disposed aperture 116 that extends from the inside wall 40 of the collar 34. A lock screw 118 also is employed. Accordingly, the free end 114 is positioned to permit contact with the hemispherical ball 46 to help center the collar assembly 18 and allow the pins of the pin assembly 44 to come into contact with the hemispherical ball 46.

Figure 15:
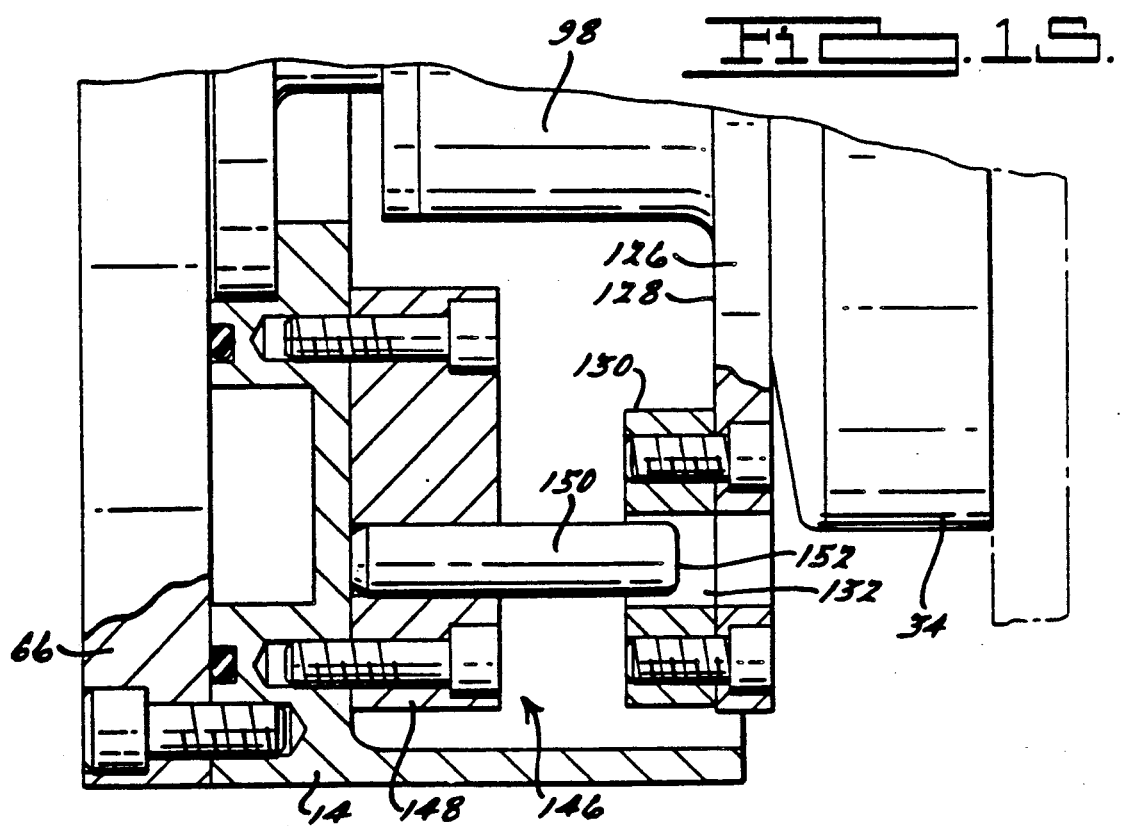
FIG. 15 is a view of the clutch device taken from line 15—15 of FIG. 11.

Further, as seen in FIGS. 13, 14 and 15, the rounded edge 38 of the collar 34 has a relatively gradual taper. The tapered portion 42 of the inside wall of the collar 34 extends to the rim 34a of the collar 34.

As shown in FIGS. 12, 13 and 14, the hemispherical ball 46 of the rod and hemispherical ball assembly 20 is secured to the rod 50 by a suitable fastener 120 such as a longitudinally disposed nut. The rod 50 of the rod and hemispherical ball assembly 20, in turn, is attached at its second end 54 to a rod mounting plate 122. The rod mounting plate 122 has one or more apertures therein for receiving a suitable fastener 124 to secure the rod mounting plate 122 to the housing 14.

In the embodiment as shown in FIGS. 13, 14 and 15, the piston 98 has a radially depending annular flange portion 126. The annular flange portion 126 has a surface 128 that generally faces the base 66 of the housing 14.

As shown in FIG. 15, the piston 98 also has one or more antirotation block members 130. A typical antirotation block member 130 has a cavity 132 defined therein, and is secured to the surface 128 of the annular flange 126 facing the base 66 of the housing 14.

In this embodiment, actuation of the piston assembly 22 between a broken-away and non-broken-away positions is accomplished by the employment of a suitable air stroke actuator or "air bag" assembly 134, such as depicted in FIG. 13, and by phantom lines in FIG. The air bag assembly 134 includes a plurality of circumferentially spaced apart inflatable air bags 136. Each air bag has a base portion 138, a top portion 140, and a bag portion 142 that is disposed between the base portion 138 and the top portion 140. Disposed between at least two of the air bags 136 are one or more proximity sensors 154 and an antirotation assembly 146. The air bags are in communication with a source of air or other suitable gas (not shown). Thus, the air bags can be inflated to a predetermined pressure to maintain the clutch in a generally non-broken-away position by introduction of such gas into the bag portion 142 of the air bag 136. In its "inflated condition," as used herein, the air bag is inflated with gas to a level sufficient so that the top portion 140 of the air bag 136 contacts the surface 128 of the piston which, in turn, maintains the collar assembly in a generally non-broken-away position.

A suitable pressure sensing device 147 (shown as a black box in FIG. 13) is also in signaling communication with the pneumatic source and the air bags 136. Accordingly, upon sensing a pressure occasioned by an undesired external motion, the pressure sensing device can signal the pneumatic source to cause evacuation from inflated air bags of a predetermined amount of gas to allow the piston to translate longitudinally along the rod away from the collar assembly. The clutch device thus operates in a manner similar to that described above for the embodiment shown in FIGS. 3-10.

The antirotation assembly 146 of the present alternative embodiment is shown in more particular detail in FIG. 15. The antirotation assembly 146 includes a block member 148 secured to the housing 14 so that the block member 148 is generally opposite the surface 128 of the piston 98. An antirotation pin 150 having a free end 152 is secured to the block member 148 so that the antirotation pin 150 is substantially perpendicular to and spaced apart from the surface 128 of the piston 98. Moreover, the free end 152 of the antirotation pin is positioned within the cavity 132 of the piston antirotation block member 130. In this manner, rotation of the piston about the longitudinal axis of the housing can be limited.

As shown in FIG. 13 and by phantom lines in FIG. 11, the clutch device of the alternative embodiment further is provided with a proximity sensing assembly 154 that includes one or more proximity sensors. The assembly includes a set screw 156, having a free end 158, that is secured to an exterior side wall 160 of the piston 98 with the aid of a suitable fastener 162 such as a hex nut. The proximity sensing assembly also includes switching portion 164. The switching portion 164 has a switch bracket 166 to help maintain the switching portion 164 in a generally stationary position; a housing 168 for a switch cable (not shown) in switching communication with a switch set screw 170 having a free end 172; and a switch (not shown). The free end 172 of the switch set screw 170 is disposed in a spaced apart, but face-to-face, relationship with the free end 158 of the set screw 156 when the clutch is in a non-broken-away position. The proximity sensing assembly, in turn, also communicates with the pneumatic source to adjustably inflate (or deflate) the air bags and to help in the adjustment and alignment of the piston assembly.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

What is claimed is:

1. A clutch device adapted for use with robotic tooling, said device comprising:
   (a) a housing having a longitudinal axis;
   (b) a rod fixably secured to said housing extending substantially along said longitudinal axis;
   (c) means for attaching said connecting means to said o housing; and
   (d) means disposed about said rod for moving said connecting means between a first substantially static position to a second generally broken-away position, said moving means being adapted for actuation in response to detection of an undesired pressure external of the clutch device, whereby said moving means moves in a direction generally away from said connecting means to enable said connecting means to move to said second generally broken-away position.

2. A clutch device according to claim 1 further comprising means for allowing pivotal movement between said connecting means and said housing.

3. A clutch device as claimed in claim 1 further comprising means associated with said rod for allowing at least partial orbital movement between said connecting means and said housing.

4. A clutch device as claimed in claim 1 further comprising means for allowing movement of said connecting means in a generally lateral direction in a plane substantially transverse to said longitudinal axis of said housing.

5. A clutch device as claimed in claim 1 wherein said moving means is moved by pneumatic means.

6. A clutch device as claimed in claim 1 further comprising means for attaching said clutch device to a robot.

7. A clutch device as claimed in claim wherein said moving means includes air bag means.

8. A clutch device adapted for use with robotic tooling, said device comprising:
   (a) means for sensing a pressure from an external source;
   (b) a housing having a longitudinal axis;
   (c) a rod secured to said housing, said rod extending substantially along said longitudinal axis;
   (d) means for connecting said clutch device to the robotic tooling;
   (e) means for pivotally attaching said connecting means to said housing; and
   (f) means disposed about said rod for moving said connecting means between a first position and a second position, said moving means being activated by a signal received from said sensing means, whereby said connecting means moves to a generally broken-away position when said moving means moves in a direction generally away from said connecting means.

9. A clutch device as claimed in claim 8 further comprising means associated with said rod for allowing at least partial orbital movement between said connecting means and said housing.

10. A clutch device as claimed in claim 8 further comprising means for allowing movement of said connecting means in a generally lateral direction in a plane substantially transverse to said longitudinal axis of said housing.

11. A clutch device as claimed in claim 8 wherein said moving means is moved by pneumatic means.

12. A clutch device as claimed in claim 8 wherein said moving means includes air bag means.

13. A clutch device adapted for use with robotic tooling, said device comprising:
   (a) means for sensing a pressure from an external source;
   (b) a housing having a longitudinal axis;
   (c) a rod fixably secured to said housing extending substantially along said longitudinal axis;
   (d) means for connecting said clutch device to said robotic tooling;
   (e) means for pivotally attaching said connecting means to said housing;
   (f) means for allowing at least partial orbital movement between said connecting means and said housing; and
   (g) means disposed about said rod for moving said connecting means between a first substantially static position to a second generally broken-away position, said moving means including air bag means that can be inflated to a predetermined pressure by a signal from said sensing means, whereby said moving means moves in a direction generally away from said connecting means to enable said connecting means to move to said second generally broken-away position.

14. A clutch device as claimed in claim 13 further comprising means for allowing movement of said connecting means in a generally lateral direction in a plane substantially transverse to said longitudinal axis of said housing.

15. A clutch device as claimed in claim 13 wherein said moving means includes a plurality of circumferentially spaced apart air bags 16. A clutch device as claimed in claim 13 further comprising means for attaching said clutch device to a robot.

17. A clutch device as claimed in claim 13 further comprising means for limiting said moving means from rotating about said rod.

18. A clutch device as claimed in claim 13 wherein said pivotal attaching means includes a hemispherical ball having a plurality of flat surfaces.

19. A clutch device as claimed in claim 18 wherein said rod and said hemispherical ball are separable from each other.

20. A clutch device as claimed in claim 13 wherein said rod is fixably secured to said housing with a rod mounting plate.

21. A clutch device adapted for use with robotic tooling, said device comprising:
    (a) means for sensing pressure;
    (b) a housing having a longitudinal axis;
    (c) a rod fixably secured to said housing extending substantially along said longitudinal axis;
    (d) means for connecting said clutch device to said robotic tooling;
    (e) means for attaching said connecting means to said housing; and
    (f) means disposed about said rod for moving said connecting means between a first substantially static position to a second generally broken away position, said moving means being activated by a signal received from said sensing means, whereby said moving means moves in a direction generally away from said connecting means to enable said connecting means to move to said second generally broken away position.

22. A clutch device according to claim 21 further comprising means for allowing pivotal movement between said connecting means and said housing.

23. A clutch device as claimed in claim 21 further comprising means associated with said rod for allowing at least partial orbital movement between said connecting means and said housing.

24. A clutch device as claimed in claim 21 further comprising means for allowing movement of said connecting means in a generally lateral direction in a plane substantially transverse to said longitudinal axis of said housing.

25. A clutch device as claimed in claim 21 wherein said moving means (f) is moved by pneumatic means.

26. A clutch device as claimed in claim 21 further comprising means for attaching said clutch device to a robot.

27. A clutch device as claimed in claim 21 wherein said sensing means further comprises means for sensing a pressure from an external source.

28. A clutch device adapted for use with robotic tooling, said device comprising:
    (a) means for sensing a pressure from an external source;
    (b) a housing having a longitudinal axis;
    (c) a rod fixably secured to said housing extending substantially along said longitudinal axis;
    (d) means for connecting said clutch device to said robotic tooling;
    (e) means for pivotally attaching said connecting means to said housing; and
    (f) means disposed about said rod for moving said connecting means between a first substantially static position to a second generally broken away position, said moving means being activated by a signal receive from said sensing means, whereby said moving means moves in a direction generally away from said connecting means to enable said connecting means to move to said second generally broken away position.

29. A clutch device as claimed in claim 28 further comprising means associated with said rod for allowing at least partial orbital movement between said connecting means and said housing.

30. A clutch device as claimed in claim 28 further comprising means for allowing movement of said connecting means in a generally lateral direction in a plane substantially transverse to said longitudinal axis of said housing.

31. A clutch device as claimed in claim 28 wherein said moving means (f) is moved by pneumatic means.

32. A clutch device as claimed in claim 28 further comprising means for attaching said clutch device to a robot.

33. A clutch device adapted for use with robotic tooling, said device comprising:
    (a) means for sensing a pressure from an external source;
    (b) a housing having a longitudinal axis;
    (c) a rod fixably secured to said housing extending substantially along said longitudinal axis;
    (d) means for connecting said clutch device to said robotic tooling;
    (e) means for pivotally attaching said connecting means to said housing;
    (f) means for allowing at least partial orbital movement between said connecting means and said housing; and
    (g) means disposed about said rod for moving said connecting means between a first substantially static position to a second generally broken away position, and moving means being activated by a signal received from said sensing means, whereby said moving means moves in a direction generally away from said connecting means to enable said connecting means to move to said second generally broken away position.

34. A clutch device as claimed in claim 33 further comprising means for allowing movement of said connecting means in a generally lateral direction in a plane substantially transverse to said longitudinal axis of said housing.

35. A clutch device as claimed in claim 33 wherein said moving means (f) is moved by pneumatic means.

36. A clutch device as claimed in claim 33 further comprising means for attaching said clutch device to a robot.

37. A clutch device as claimed in claim 33 further comprising means for limiting said moving means for rotating about said rod.

38. A clutch device as claimed in claim 33 wherein said pivotal attaching means (e) includes a hemispherical ball having a plurality of flat surfaces.

39. A clutch device as claimed in claim 38 wherein said rod and said hemispherical ball are an integral unit.

40. A clutch device as claimed in claim 33 wherein said rod is fixably secured to said housing with a tapered dowel pin.

* * * * *